(12) United States Patent
Pierpont

(10) Patent No.: X5771
(45) Date of Patent: Jan. 8, 1830

(54) FIRE-PLACE, DORIC

(76) Inventor: John Pierpont

John Pierpont. of Boston. Mass:
Letters Patent

The schedule referred to in these Letters Patent and making part of the same, containing a description in the words of the said John Pierpont himself, of his improvement. being a method of warming & ventilating rooms by burning anthracite or other coal in an open & portable fire place or stove which I call. The Doric Fireplace.

---

To all to whom these presents shall come: Be it known that I John Pierpont of Boston, in the County of Suffolk & Commonwealth of Massachusetts have invented & carried into effect a new & useful method of warming & ventilating rooms, by burning anthracite or other coal, in an open & portable fire place or stove, which I call the Doric fireplace; which may be made in a variety of different forms, but in every form, must be constructed & arranged upon the principle of supplying to the room that is to be warmed & ventilated in lieu of the air that thro' the smoke flue or chimney passes out of it & that by the operation of the fire itself an equal quantity of fresh air, from without the room which as it comes in, is warmed by being made to pass over or between the heated surfaces of bodies not metalic, or if metalic bodies that have not been brought into contact with a burning substance. The method of warming & ventilating rooms by means of any combination or arrangement of materials upon this principle, is what I claim as my invention. One mode of reducing this principle to practical application or use, is by the Doric fire place or stove. This is, indeed the mode that I prefer, tho' not to the exclusion of any other; & it is this fire place of which the construction and arrangement are particularly set forth in the following description — The Doric fireplace may be made so as to stand either within the jambs of a common fireplace, or in a parlour, hall, or other large room in which there is no fire place. In the latter case it will require a different construction or arrangement in some of its parts from what it does in the former. I describe them in their order —
When my fire place, or stove, is placed within the jambs of another fireplace it presents the appearance of a portico, or gateway, the height & breadth of
which are about equal, exhibiting an entablature (this strictly speaking is only
the architrave or lower member of an entablature, but as the friese, is not in-
troduced, & as the cornice is very light, I use the word entablature, some times
for all that part of the fire place which is above the column, & sometimes the ar-
chitrave only by that figure of speech which puts a part for the whole) resting
upon two columns, which I prefer to have of the Doric order, but which may
be of any other according to the taste of the manufacturer, about one quarter
of the column, both shaft & capital, is cut out longitudinally - so that it may
set on about half its diameter, upon each corner of the upright part or body
of the stove. allowing the front & side plates, that are perpendicular, & at right-
angles with each other to meet in the centre of the column. Of the body, of
the fireplace, the whole front & about three quarters of each side stand in
sight - The back part of the side plates, & the whole of the back plate are
hidden by the brick or stone work within which it is set - Between the
columns, in front & from three to four inches from the centre of each, is the
open pit, chamber or cavity for the coal. This may be of a size that
shall be proportional to the room or space that is to be warmed & venti-
-lated, & the size of the fireplace, or stove will be in a good degree determin-
-ed by the size of the coal chamber. -
The proportions of this chamber, or pit, however, should be about as follows:
measured at the top bar of the grate, (which will be described hereafter) which is
supposed also to be near the top of the body of coal, when the pit is filled.
its perpendicular depth should be about one half, & its depth, measured horizon-
-tally from the front of the grate & at right angles with it, about three
quarters of the length of the chamber in front. The sides of the horizontal se-
-ction of the chamber, which I am now describing, form a parallelogram, whose
breadth is about is about three quarters of its length, except that the side
towards the room, i.e. the side coinciding of the top bar of the grate is an
eliptical curve. All the sides of the chamber now described as they go down
towards the bottom, converge with a gentle curve, making the bottom of the
coal chamber smaller than the top, by nearly or quite half. Of this cham-
-ber or pit for coal, three sides, viz: the back & the short sides on the right &left are of fire bricks, or pipe clay, moulded to fit. Steatite, or soap
stone, may be used but to less advantage in every respect. Iron must not
be used on any account. The front of the coal chamber is a grate of cast iron.
wrought iron may be used, but at an additional expense without any addition-
al advantage. The front horizontal bar of the grate, is half of an ellipse,
having at each end a projection in a line with its longest diameter, by
which it is upheld, being dropped into a hook, cast or otherwise fixed, upon
the inside of each of the perpendicular pieces that stand in front, on the
right &left of the coal chamber. Thro' this horizontal bar pass the upright
bars of the grate, which both above &below curve forward from it, extending
above it about two inches, & below it, after curving a few inches outwards,
turning ^ with an easy curve sweeping under; converging as they descend till
they reach the bottom of the brick sides. then running back horizontally &
parallel about 3/4 of an inch apart, till they strike the bottom of the back
brick; the lower &most receding part of the grate being a bar, crossing
those just described at right angles &extending beyond them on the right
&left. the part thus projecting, to rest upon the same pieces of iron upon which
the fire bricks stand; the brick on each side having a notch to hold the
grate in its place. The upper part of the coal chamber is formed by three
pieces: a sloping back, &two side pieces, all of which should be of fire bricks,
tho, as the coal does not act upon these with the same power as on the lower
parts of the chamber, these pieces may be of steatite, especially the sloping back
for which it may be difficult to procure fire bricks sufficiently large.
The sloping back rests, at the bottom, upon the top of the back of the coal
chamber already described, and comes up towards the front of the fire place,
at an angle of from 40 to 50 degrees with the horizon, till it strikes the
narrow plates on the right &left of the coal chamber, not far from the
middle between the top &bottom of the entablature that lies upon the top of
the columns, &corresponds to the mantle of a common fire place.
The pieces on each side will be a right angled triangle, the right angle
being at the bottom in front, where the grate is suspended on its hooks, &
the other angles depending upon the slope of the back, which is indeed
supported by them. The sloping back should be dropped down a little between the side pieces, by a shoulder at each side, to make the joint more secure, as well as to prevent the side pieces from collapsing – The top & bottom of the sloping back must be bevelled, so that when fixed in place, a horizontal line will describe each of them & on the right & left it should extend beyond the coal chamber, by the whole thickness of the triangular pieces on which it rests, or even so much beyond, as to let the sloping edge of these pieces fall into a shallow groove in the back. These pieces, as indeed all the bricks should be, about the thickness, of ordinary fire bricks, tho, if the fire place be small, the thickness may be somewhat reduced. The sloping back need not be so thick. If it be of soap stone, one & a half inch is sufficient & even a less thickness will answer – – – – –

Upon the inside of each of the narrow plates on the right & left of the coal chamber, & at about half the depth of the entablature, there is a small projection intended to support the front of what I call the throat piece, or smoke flue; which is a piece, the front section of which consists of one long & the two short sides of a narrow parallelogram, which being laid with the short sides upward & the broad plate down resting in front upon these small projecting pieces & a course of fine mortar lying upon the top of the sloping back, & at the back, upon a ledge prepared for it near the top of the back plate of the fire place, which is cut at top to open a corresponding passage, under the top plate, constitutes the bottom & two sides of the passage for the smoke, the top being made by the top plate of the fire place. The two sides of this throat piece are grooved or rabbetted at the top, as they lie in place, & the tonge or corresponding part of the rabbet is fixed upon the under side of the top plate. When the fire place is put up, this groove is filled with fine mortar or luting & the tongue drops into it, so as to cut off all possible communication between the smoke flue & the air chamber, to be described hereafter – About two & a half or three inches below the bottom of the coal grate is a fine grate, the object of which is to separate or screen the ashes from the fine coal that falls from the coal grate: The ashes passing through into the ash pan standing under it, leaving the coal to be thrown up again into the fire chamber, or furnace. The bars of this grate are, about a quarter of an inch thick, being made deep enough to have all all necessary strength & a quarter of an inch apart, running from the front towards
the back of the fireplace - This is of the same length & breadth as the coal chamber
at the place of its largest dimensions, viz: on a horizontal line with the bottom
of the sloping back, it runs in front, on a line with the upright plates that
stand between the columns, on the right & left of the coal chamber; occupying
the whole space between these plates, & it runs back to within about three in-
-ches of the back plate of the fireplace - -
The section of this fine grate, as seen in front (the back end being the same
shape but hidden) consists of one long side, & the two short sides of a parallelo-
gram. When in place the long side lies up, & its plane extended back consti-
-tutes the fine grating: the short sides, which support it, run back in narrow
planes, parallel to each other, & at right angles with the top plane, & help form
the sides of the pit or vault within which, & under the fine grate, stands the
ash pan which slides in & out upon the hearth of the original fireplace.
(The ash pan may safely & conveniently be dispensed with letting the ashes
fall upon the hearth, to be removed as in a common fireplace) - .
This grate however does not stand upon the original hearth, but upon the
bottom or ground plate of the Doric fireplace - About midway between the
bottom of the coal grate, & the top of the fine grate on the right & left of
the furnace or coal chamber, lies a plate, supported on the front by little
projections on the inside of the perpendicular front plate: on the back by
similar projections on the large back plate of the fire place - & if need be, on
the long side by similar projections or resting points on the inside of the main
side plates - On these plates on right & left, the fire bricks are laid which com-
-pose the sides of the coal chamber or furnace, & from that side of each of
these plates, which is next to the furnace, a narrow ledge of about an inch
runs up to protect from violence the corner of the bricks which is nearest the
fire. & at the same time to afford a support to the coal grate at the bottom.
From the same side, but about an inch towards the outside of the fire
place, another ledge somewhat wider runs down, & lies upon each out side the
fine grate, being supported by that on the inside. The side of each of these
plates which is towards the outside is cut out so as to leave room, between it
& the side plate of the fire place for the air to pass freely from the bottom, to the top of the fire place. The brick upon the back of the furnace is sup-
-ported by a piece consisting of two planes at right angles, one wider than
the other, the narrow plane is a little longer than the broad one, & rests at
each end upon one of the two side plates already described and the broad-
-er plane drops down, perpendicularly to the ground plate, of the fire place,
is of the whole length of the fire grate & is in contact with the back part of
it, cutting off thus all communication of air between the back part of the
fire place at bottom, & the furnace or coal chamber. This piece, when in
place, is about two inches forward of the back plate of the fireplace, leaving
space for the air to pass freely up from the hole cut in the bottom of that
plate for its admission; the fire grate being at such a distance from the
side plates of the fireplace as to let the air admitted at the same opening
pass freely round, that it may pass up at the sides.... ...
The back plate extends from the inside of one of the side plates to the inside
of the other, being supported between them & prevented coming forward, by one
or more small projecting pieces near the back edge of each side plate.
This plate has a piece cut out from the bottom, about three inches deep &
from six to twelve inches long, for the admission of air, which must always
be admitted from without the room that is to be warmed & ventilated.
Above this opening there are several upright ledges or projections from six
to twelve inches long, & from an inch to two inches wide, & of the general
thickness of the plates: against which the top of the back brick or bricks &
the bottom of the sloping back of the furnace or coal chamber rest & by
which they are kept forward from the back plate; so that the air from the
bottom may pass freely up behind them. Similar ledges run up & down upon
the inside of the two side plates of the fire place, for the support of the side
bricks or stones of the furnace or coal chamber, & for the transmission of air
between them & the plates. These ledges or rails, may be of any length or
position upon the plates that may be found to give the best room for the
circulation of air & for the support of the brick or stone parts of the furnace
or coal chamber. From the top of the back plate, a piece is taken out,
corresponding in width & depth with the breadth & depth of the throat piece
or smoke flue, already described; the bottom of the latter resting upon the bottom of the space now described, & just below this opening is laid horizontally
a narrow ledge or rail on which mortar or luting is laid to close the joint;
the throat piece at this, as at the other end, being so imbedded in fine mortar
or luting as to make it impoſsible for the smoke to escape into the warm air
chamber, or for the warm air to paſs off by the smoke flue into the chimney.
From the top of each side plate there is also a piece taken out, about half as
long as the opening in the top of the back plate, & so deep that the bottom of the
opening. made by taking out this piece may be as low within about half
an inch as is the top of the capitals of the columns, or bottom of the intallature
that rests upon them. These openings, one in the top of each of the side plates
are for the air, that is admitted into the fireplace at the bottom of the back,
& warmed by paſsing between the outside plates of the fire place and the bricks
or stones of the furnace or coal chamber, to escape freely into the room.
The bottom or ground plate lies under the back & sides of the fireplace but not
under the coal chamber, or furnace, this part being calculated to let the ash
pan stand upon the hearth thus saving in weight of metal & deepening the
ash vault, or space under the fire grate, the plinths of the columns are the
only part of the ground plate which is seen on a front view. From the back
of the column on each side, the ground plate conforms to the side plate, &
on the back of the fireplace, to the back plate; a little ledge of about a quar-
-ter of an inch high running along the bottom of each of the side plates
to keep them in place & conceal the joint which they make at bottom,
with the ground plate. The breadth of the two short sides of this plate will
be the distance between the outside of each side plate of the fireplace, &
the leg or side of the fire grate, which stands next to it. The breadth of the
back of it will be the distance between the outside of the back plate, & the
piece which drops down behind the fire grate, or the breadth will be
in each case, what is left, of a plate of the size of the whole body of the
fire place, a piece being taken out of the front, of about the size of the low-
-er part of the fire grate. To this ground plate each side plate is fas-
-tened by two tenons cast upon the inside of it, at the bottom & paſsing
thro' holes cast in the bottom plate, to seure it against lateral motion;
by two shoulders or pieces projecting inwards of an inch or more square in contact with the ground plate, & fastened to it by a short square headed bolt which passes thro' a smooth hole in the shoulder, & having a screw at the end holds upon a corresponding thread in a hole thro' the bottom plate. — The back plate has at bottom, on each side of the opening for the admission of air, a tenon cast upon the inside, & setting into a hole in the plate — The two narrow front plates have, each of them two similar tenons on the inside, at bottom passing into corresponding holes in the ground plate. at top, or near the top of each of the narrow upright plates in front, & on the inside of it, is a similar shoulder, the face of which stands parallel with the side plate. Thro' this is a hole tapped, and a short square headed bolt passes thro. the side plate into it & fetches the side plate against the little projections upon the front plate which brings & holds the corner of the front & side plates together. Upon the back corner of each side plate, there is a similar shoulder, or projecting piece, lying parallel to the back plate. There is a smooth hole cut thro. each of them, & a bolt running thro. them holds by a screw; upon a corresponding hole tapped thro. the back plate: which brings & holds the back plate fast between the two side plates — — By this means the five perpendicular plates are kept in place & all fastened to the ground plate — The same work may also, but not so conveniently, or neatly, be done by a rod passing thro' the front & back plates on either side, crossed by other rods passing thro. the side plates in front & rear. secured in each case by a square head, on one end of the rod & a nut & screw on the other pressing upon the outside of the respective plates: & by four similar rods coming up thro. the bottom plate, with square heads on the under side of that plate & binding at the upper end of the rod by a nut pressing a button, one end of it upon the rod running horizontally & the other upon a little projection or ledge cast upon the side plate — The four perpendicular sides & the bottom being thus fastened together, the top is free to be taken off at pleasure for putting in the bricks or stones that compose the coal chamber, either when the fireplace is at first set, or whenever afterwards, these parts must be restored after being destroyed or damaged by the fire — The column is held on either side, at bottom, by a small pin fastened into the bottom & extending down from a quarter to half half an inch thro. a small hole drilled thro. the ground plate. This plate I
would observe has a thin strip or border passing entirely around it & lifting its
upper surface about an inch from the hearth, which gives the plinth of the
column, & indeed the whole ground plate, the appearance of being about an
inch thick. the lower edge of this strip or border resting upon the hearth.
To bring, & keep the column to its place at top, a small hole is bored
through it & countersunk upon the outside, thro' which a small short rod
is passed from the inside of the column & riveted on the outside -- --
The other end of the rod passes thro. a hole made by a small notch in
the edge of both the front & side plate, of the same height from the bottom,
with the hole bored thro. the column: & being furnished with a nut & screw
a button is slipped upon it, & by the nut, is driven up till its ends press one
upon the front & one upon the side plate, & thus binds the column to them
both on the outside. The ovolo of the column is turned and a quarter of it
cut out. that it may fit upon the corner of the fire place; and by a little
neck which drops into the column it is kept in place. The square part of the
capital is cast with one quarter also cut out at right angles, to fit upon
the same corner; & this is kept in place by means of projections upon the upper
surface of it, the outside of which is pressed upon by the inside of the plates
which compose the entablature -- The entablature consists of three narrow plates,
the front & two side plates. The front lies upon the capitals. & its projection
forward of the upright plates of the fireplace will be determined by the di-
-ameter of the column & the extent to which it falls back, or comes forward
upon the corner of the fireplace. an inch & a half is enough ordinarily for
considerations of utility. If necessary from considerations of symmetry & beauty it
may be more. it ought not to be less. Upon the inner side of this plate on a
line with the bottom of it there is cast a thin horizontal piece that
sets back till it touches the upright front plate of the body of the fire place
This extends from the inner side of the square part of the capital to the in-
-ner edge of the plate last named. it is there met by another thin piece that
runs perpendicularly across the front plate of the entablature on the inside
& extends back till it falls just within the inner edge of the narrow front
plates, defining thus the space for the passage of the smoke & cutting off all communication between it & the air chamber by means of the opening, between the entablature & the upright plates of the fire place. The side plates of the entablature run back from each end of the front plate, at right angles with it, & parallel with the line of the side plates of the body of the fire place. A thin & narrow ledge runs across the inside of the front plate of the entablature, within about thickness of the plate from each end of it. One end of the side plate is lapped upon this ledge, & riveted fast to it, making a close joint on the side, & not on the front of the entablature. Each side piece then runs back till it comes upon a line with the back plate of the fireplace. A perpendicular piece projects from the inside of each side piece, & lodges upon the side plate of the body of the fire place, at the bottom & extreme back part of the space cut out from the top of that plate, as heretofore described for the escape of the warmed air into the room, a little notch being cut in the end of this projecting piece, to prevent the plate from springing in beyond its place, as also to prevent that part of the entablature from being thrown up above the top of the other plates — —

When in place, the top of the entablature, on all three of its parts, the top of the five upright plates of the body of the fireplace, & the grooved top of the throat piece, are all exactly upon a line; & the entablature plates are parallel with the front & two sides of the fire place. The top plate may be as to its upper surface, a plain table projecting, upon the front & the two sides, so far beyond the entablature as may be thought to be required by the considerations of architectural symetry. Upon the under side of the front & two ends, runs a ledge or moulding, of about half an inch deep, the inside of which shall bind upon the outside of the entablature at top the upper edge of which, as of the five upright plates, & of the grooved sides of the throat piece must come into contact with the under surface of the top plate. As the top plate may be made to project as far beyond the back plate as it does beyond the front & sides of the entablature, & the moulding that runs upon the front & ends of the top plate, may be returned upon the back, so as to shut down upon the back plate, as upon the entablature, excepting only the part of the back under which the smoke flue passes. On the under side of the top plate, there are cast two ledges, corresponding in length & depth to the groove in the sides of the throat piece, & so adjusted
that when the top is in place, these ledges or tongues drop into the the grooves.
This arrangement of the Top plate is sufficient for the ordinary purpose of
warming & ventilating, the room where the fire place is set. But it is often
desirable to supply the room with that moisture which the air becomes ca-
pable of holding in suspension as its temperature is raised. To this end I
make an opening thro. the top into the flue thro. which the heated smoke
or gas & sometimes flame passes off into the chimney. into this hole may be
set any vessel which may suit the taste of the manufacturer, a bowl or
a vase, or an urn, so constructed that it may stand upon the bottom of the
throat piece, & so that water, poured into it may pass thro' the top plate
into that part of the vessel which goes into the smoke flue; one third part
of which it may safely occupy; and thus the fire after having warmed
the air of the room, by throwing a part of its heat directly upon the objects
exposed to its rays, by transmitting another & much greater part of it thro.
the walls of the furnace & giving it to the column of air that is constantly
passing over them from abroad & coming warmed into the room, as its
last office supplies the room with that moisture which the comfort, pleas-
-ure, or health of its occupants may demand. This moisture may be in-
-creased by any arrangement by which a larger surface of water is exposed
to the action of the heat. In some cases therefore, I take out almost the
whole of that part of the top plate which lies over the smoke flue & sub-
-stitute in its place a broad shallow pan the middle of which I deepen,
that it may be more exposed to the action of the fire, & throw over the pan
a covering of any such form as the taste of the manufacturer may devise,
to conceal the water & let the vapour pass off into the room. The top plate
over the air chamber, may also be opened in any ornamental figure, or
fret work, at the pleasure of the manufacturer so as to let the warmed air
escape thro. the top, if for any reason it should be desired, rather than
through the opening in the top of the side plates & under the sides of the
entablature. When the Doric fireplace is to stand in a parlour hall or
other room not within the jambs of the original fire place, there is a differ-
-ent form & arrangement of some of its parts. It assumes then the general appearance of an altar, the entablature running upon all four of the sides & resting upon a column at each of the four corners. The air from abroad must be introduced thro' the bottom or ground plate, between the back plate & the piece which drops down behind the fire grate, & the smoke or gas, passing off thro' an opening in the back plate under the entablature. In this case the ground or bottom plate is so constructed as to give at each corner a plinth to the column. It has an opening in the middle of the back part of it, for admission of air thro' the floor or hearth upon which it is placed. The side plates of the entablature must be lengthened so as to lie upon the capitals of the back columns as they have been seen to lie upon those of the columns in front, and they are fastened together in the same way at the corners —. The back plate at bottom runs upon a line with the upper surface of the groun plate, and, at top, upon a level with the side plates, and with the top of the entablature, just below the entablature. & in the centre from right to left is an opening, which may be an ellipse, or a parallelogram, or indeed any other shape that will suffer the air, with the gas or smoke to pass freely & at the same time not encroach upon the entablature above, or the parts of the furnace below. This orifice must always exceed, it should exceed by half, in superficial inches the opening at the front of the fire place where the smoke enters the flue on each side, & at the bottom of this orifice on the inside of the plate there runs a slight ledge within which the back edge of the smoke flue or throat piece rests; the joint that it makes with the back plate being perfectly closed with mortar or lute. —

The throat piece or flue, is like that already described in case of the fire place with two columns, except in that, after it has run back beyond the back part of the sloping stone, or tile of the furnace, the bottom of the flue, for at least half of its length from right to left, is made to incline downward at an angle of about forty five degrees, & is continued down till it strikes the back plate below the orifice already described. a triangular piece connects on each side this inclined bottom, with that part of the bottom of the flue which remains horizontal, and its farther edge strikes the back plate, within the perpendicular ledges already described. The grooved piece upon each side of the flue, is [illegible] returned upon the back, until it comes to the triangular part connecting the inclined with the horizon-
tal part of the flue, & under these grooved parts of the flue, there should be
a horizontal ledge cast upon the back plate, to help cut off by means of
luting or mortar all possible communication between the smoke flue & the
air chamber. The top of the fire place, in this case must be so much
wider than when it stands between the jambs, as to extend as far over the
back as it does over the front of the entablature having a ledge or moul-
-ding on the under side to bind the entablature on all sides alike.
The same arrangements may be made in this, as already suggested in the
other case, for increasing the moisture given to the room, by exposing a
larger surface of water to the heat. On the outside of the back plate.
a rim from half an inch to an inch deep runs round the orifice, for the
passage of the smoke or gas. Upon this slips the end of the funnel or pipe
which ought not to be diminished as it extends, & which may communicate
either with a chimney or with the external atmosphere directly according to
the circumstances of the room, or the pleasure of the proprietor. — —
In the fireplace of which I have given the description I have endeavoured,
to combine utility with beauty, — I therefore prefer the column at each cor-
-ner as specified. But it may be constructed with pilasters instead of col-
-umns, & the pilaster may be of any order that the manufacturer may
chuse. In this case the pilaster may be cast in a piece by itself, the
two halves of it standing longitudinally at right angles with each other,
one half lying up on the narrow front plate, & the other upon the side
plate letting it be held to its place by a pin or pins at the bottom, & at
the top, by a continuation of the pilaster beyond the capital, that shall
fall under & be bound by the entablature, which in this case will be
brought so near the body of the fire place that to secure its efficient
opperation the throat piece must be cut away in front, for the free pas
-sage of the smoke or gas, & as the passage under the entablature will be
nearly closed, so that the warm air cannot escape freely thro' it, the
top must be opened, on the right & left of the smoke flue, that it may
come up thro' that. This opening may be of such shape & concealed
by such ornamental figures as the taste of the manufacturer may suggest.

When the pilaster is used, the top plate will be reduced in proportion to the size of the body of the fireplace; for it still must hold its due relation to the entablature on which it lies, & generally there will be a sacrifice of beauty to considerations of expense; but, as the fireplace with this arrangement of parts, is constructed & operates upon the same principle as when columns are used, I embrace it in my specification that it may be covered by my patent — The ash pan, which may be added or not, according to the choice of the purchaser, may be of plain sheet iron flaring at top, especially at the back part of it, & made of such size that it will slide upon the original hearth & pass under the fire grate — —

It may be hidden, in front either by a plain, or an ornamental brass plate forming part of the pan itself, or by a fender of brass or cast iron standing between the plinths of the front columns & coming forward, either at right angles, or in a curve, a few inches farther than the extreme projection of the coal grate, & having an apron of sheet iron or brass extending from the inside of the front of the fender, so as to rest upon the front edge of the fire grate; so that ashes or coals that fall from the coal grate may be easily swept back upon the fire grate, & pass out of sight, or be thrown up again upon the fire — In the foregoing specification I have said nothing of brass or other ornaments — I give the fireplace in its simple form supposing its beauty to consist in its severe simplicity — The columns, or indeed any other part of it may be ornamented with brass, polished steel, or other material according to the taste of the manufacturer or the purchaser, without departing from the principle upon which the fireplace is constructed, as above stated — This method of warming & ventilating rooms I consider as a useful invention, for the following reasons. 1 Because it secures the safe, & entire combustion of the coal. 2. Because it saves the heat produced by that combustion, & converts it to use by diffusing it equally & pleasantly thro. the room. 3. Because it secures the room from the evil of a smoking chimney without recourse to the bad alternative of an open door or window —

4 Because it combines & in itself unites all the principal advantages of both the usual modes of communicating heat by radiation, as in common fireplaces, and by transmission, as in close stoves securing the benefits of both without the ends of either – 5. Because it is so far portable that it can be set into a com-
mon fireplace, & again removed from it, without injury to the jambs, so that it
may be used by a tenant without becoming a fixture –
6. Because it requires no blower to help ignite the coal. 7. Because its construc-
tion or arrangement of parts is such that the iron plates are indestructible by
the heat and will therefore last indefinitely – – –
Your petitioner therefore prays that Letters Patent may be issued in his favour,
granting to him & his assigns in the usual form & for the usual Term, the exclu-
sive right of making and vending the fire place above described, within the
United States.

Witnesses
R. S. Briscoe
Thos. P. Jones

John Pierpont

[illegible]

Exd.
[illegible]

1050 [illegible]